United States Patent
Emericks

(10) Patent No.: US 7,130,416 B2
(45) Date of Patent: Oct. 31, 2006

(54) SUBSCRIBER LINE INTERFACE CIRCUIT

(75) Inventor: Anders Emericks, Solna (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 721 days.

(21) Appl. No.: 09/736,329

(22) Filed: Dec. 15, 2000

(65) Prior Publication Data

US 2001/0036262 A1    Nov. 1, 2001

(30) Foreign Application Priority Data

Dec. 17, 1999    (SE) .................................... 9904641

(51) Int. Cl.
*H04M 1/00*    (2006.01)
*H04M 9/00*    (2006.01)
(52) U.S. Cl. ........................................ 379/413; 379/416
(58) Field of Classification Search ................ 379/377, 379/399.01, 413, 416, 404, 146
See application file for complete search history.

(56) References Cited

U.S. PATENT DOCUMENTS

| | | | |
|---|---|---|---|
| 4,272,656 A | | 6/1981 | Nishikawa |
| 4,317,963 A | * | 3/1982 | Chea, Jr. ..................... 379/377 |
| 4,803,721 A | | 2/1989 | Schingh |
| 5,097,223 A | * | 3/1992 | Alexander .................. 330/126 |
| 5,249,226 A | | 9/1993 | Schopfer |

FOREIGN PATENT DOCUMENTS

WO    WO99/27704    6/1999

* cited by examiner

*Primary Examiner*—Curtis Kuntz
*Assistant Examiner*—Alexander Jamal
(74) *Attorney, Agent, or Firm*—Buchanan Ingersoll & Ronney, PC

(57) ABSTRACT

A subscriber line interface circuit (1') for supplying line current (IL') to a two-wire transmission line connected to a load (RL'), comprises a single current amplifier (3'). That single current amplifier (3') is to be connected with its output terminal to one (B') of the wires (A', B') of the transmission line, while the other wire (A') of the transmission line is to be connected to a voltage source (V1') that can be provided within the subscriber line interface circuit (1') or external thereto.

6 Claims, 3 Drawing Sheets

SUBSCRIBER LINE INTERFACE CIRCUIT

TECHNICAL FIELD

The invention relates to subscriber line interface circuits.

BACKGROUND OF THE INVENTION

FIG. 1 on the appended drawing shows a known subscriber line interface circuit (SLIC) 1 comprising two current amplifiers 2, 3 for supplying a line current IL on their respective output terminal to a tip wire A and a ring wire B, respectively, of a two-wire transmission line connected to a load RL, e.g. a telephone set, resulting in a line voltage VL across the load RL.

In FIG. 1, the current amplifier 2 is supposed to have a gain of +g, while the current amplifier 3 is supposed to have a gain of −g.

The line current supplied by the respective current amplifier 2, 3 to the wires A and B is composed of currents controlled by a DC feed unit 4, an AC transmission unit 5, and a longitudinal suppression unit 6.

In a manner known per se, the DC feed unit 4 supplies DC currents IDC to the current amplifiers 2, 3 in accordance with a predetermined DC feed characteristic such that a maximum line current IL is supplied when the line voltage VL=0, and a line current IL=0 is supplied when the line voltage VL is at its maximum. The DC currents IDC are multiplied with the gains +g and −g, respectively, to form so-called transversal line currents in the wires A and B, which determine the voltage VL across the load RL, i.e. the line voltage, Transversal currents are by definition, currents in the wires A and B that are of the same value but opposite polarity in the respective wire.

Also, in a manner known per se, the AC transmission unit 5 supplies AC currents IAC to the current amplifiers 2, 3 in response to AC signals, e.g. outgoing speech signals received from a D/A converter (not shown) as indicated by an arrow in FIG. 1. The AC currents IAC are also multiplied with the gains +g and −g, respectively, to form so-called transversal AC currents in the wires A and B, i.e. AC currents that are of the same value but of opposite polarity in the respective wire. In this connection, it should be mentioned that the transversal AC currents are the only signals that can be converted to audible signals in a loudspeaker at the load RL.

The current amplifier 2 is supposed to be connected with its voltage supply terminal to ground (not shown), and the current amplifier 3 is supposed to be connected with its voltage supply terminal to a negative voltage source (not shown), Thus, the voltage VL across the load RL has to be generated between ground and negative voltage. To avoid that the current amplifiers 2, 3 become saturated to ground and the negative voltage, respectively, the longitudinal suppression unit 6 controls the output terminals of the current amplifiers 2 and 3 by means of currents +ILNG and −ILNG, respectively, to a predetermined DC voltage value.

In some applications, the output terminal of the current amplifier 2, i.e., the A wire, is controlled such that its desired value is set to a certain voltage below ground. Then, the voltage on the output terminal of the current amplifier 3, i.e. the B wire, is set by the voltage on the A wire minus the voltage VL across the load RL.

In other applications, the mid-point between ground and the negative voltage is detected and the current amplifiers 2, 3 are controlled such that the desired voltage value across the load RL is symmetric relative to this mid-point.

In all these applications, the longitudinal suppression unit 6, in a manner known per se, detects an actual value of the above voltages and controls, by means of the currents +ILNG and −ILNG, the output terminals of the current amplifiers 2, 3, i.e. the A wire and the B wire, to the desired value.

Hereby, any so-called longitudinal currents in the wires A and B will be suppressed as will be described more in detail below with reference to appended FIG. 3.

Longitudinal currents are by definition, externally originating disturbance currents in the wires A and B that are of the same value and the same polarity in both wires.

Incoming AC signals on the transmission line A, B, e.g. incoming speech signals, are detected by a differential amplifier 7 connected with its two input terminals to the respective wire A, B.

The output terminal of the differential amplifier 7 is connected to an A/D converter (not shown) as indicated by an arrow in FIG. 1.

Today, SLICs are normally manufactured on silicon dies.

To reduce manufacturing costs, there is a desire to reduce the silicon area as much as possible. This can be accomplished e.g. by designing simpler SLICs. Hereby, less power will also be consumed.

Thus, there is a desire to miniaturize the SLIC dies as much as possible. Also, there is a desire to reduce the power consumption of the SLICs on such dies.

SUMMARY OF THE INVENTION

The object of the invention is to bring about a SLIC that occupies less silicon area.

This is attained mainly in that the SLIC according to the invention comprises a single current amplifier instead of two current amplifiers as in known SLICs.

In accordance with the invention, the single current amplifier on the SLIC is to be connected with its output terminal to one of the wires, preferably the B wire, of the transmission line, while the other wire, i.e. the A wire, of the transmission line is to be connected to a voltage source, preferably ground, on or external to the SLIC.

Thus, SLICs according to the invention can be made smaller and cheaper than the known SLICs not just because they comprise only one current amplifier but also because the the longitudinal suppression unit is not needed and the DC feed unit, the AC transmission unit, and the differential amplifier can be made simpler. Hereby, the power consumption of the SLICs according to the invention will be considerably lower than in the known SLICs.

BRIEF DESCRIPTION OF THE DRAWING

The invention will be described more in detail below with reference to the appended drawing on which FIG. 1, as described above, schematically shows a known SLIC, FIG. 2 schematically illustrates a SLIC according to the invention connected to a transmission line, and FIG. 3 schematically illustrates an embodiment of the SLIC in FIG. 2 for suppressing externally originating longitudinal currents on the transmission line.

DESCRIPTION OF THE INVENTION

Figure 1:
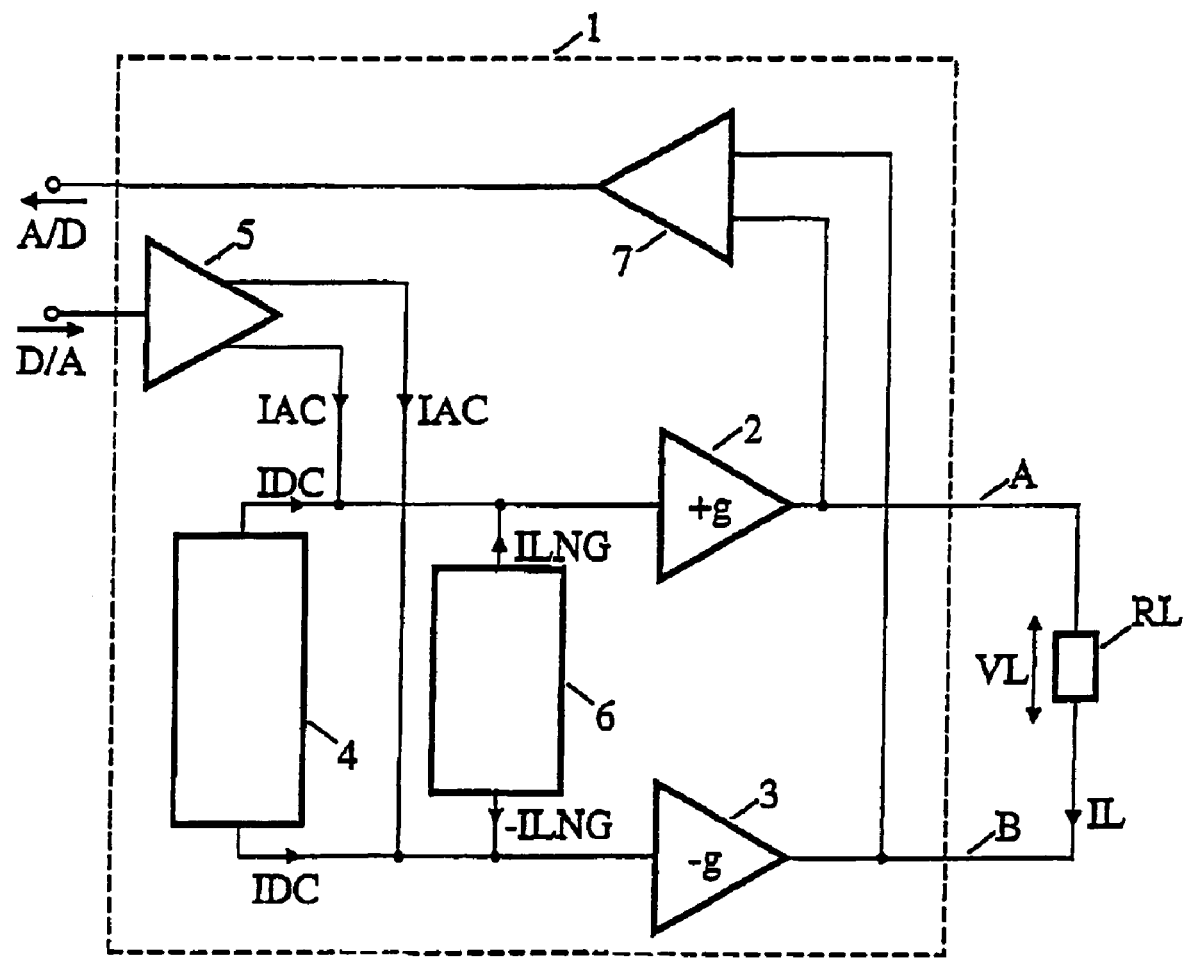
Figure 2:
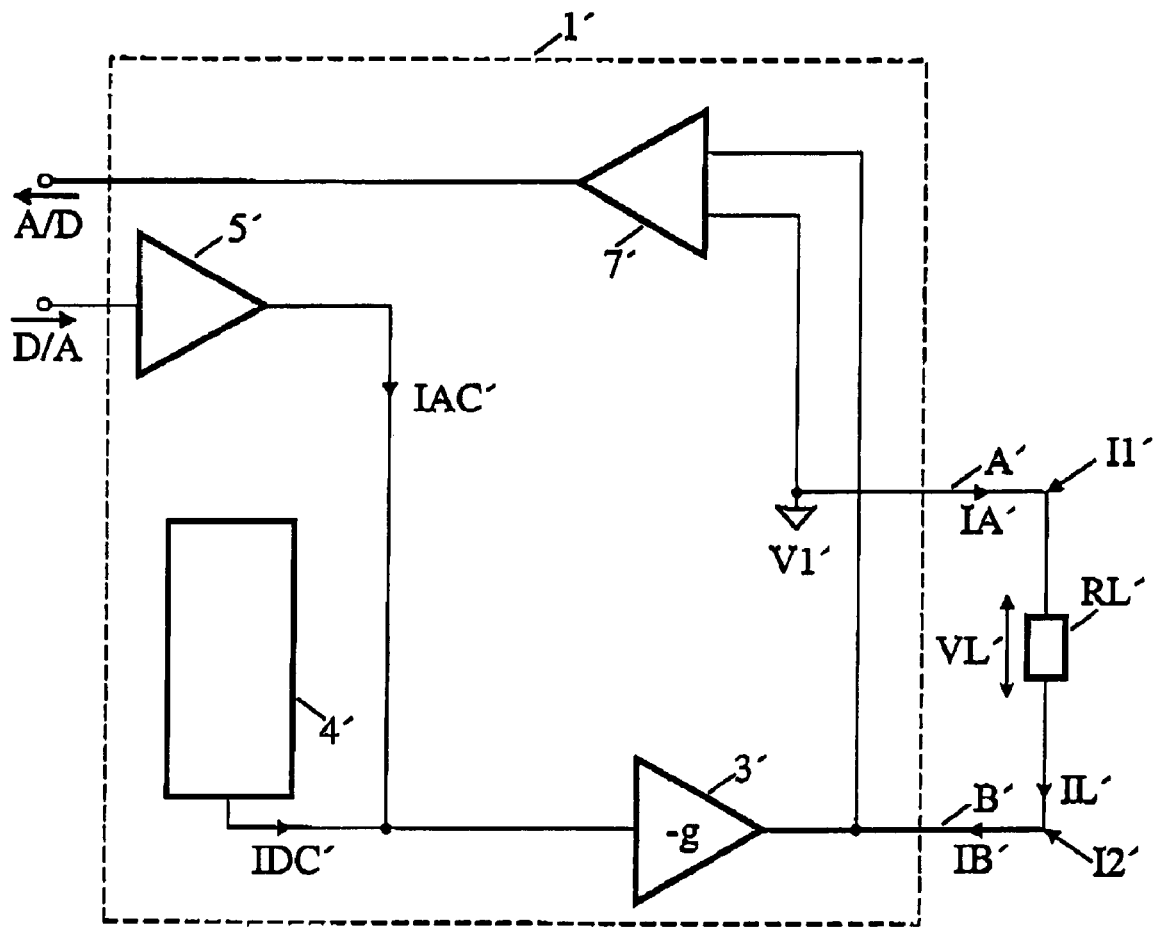

FIG. 2 schematically shows an embodiment of a SLIC 1' in accordance with the invention, comprising, instead of two current amplifiers as in FIG. 1, just a single current amplifier 3' for supplying line current IL' to a two-wire transmission line A', B' connected to a load RL'.

With just a single current amplifier 3', less die-area is needed and the power consumption will be considerably lower.

The single current amplifier 3' in FIG. 2 is supposed to have a gain of –g.

In the embodiment shown in FIG. 2, the single current amplifier 3' is connected with its output terminal to the ring wire B' of the transmission line A', B'.

In accordance with the invention, the tip wire A' of the transmission line A', B' is to be connected to a fixed voltage source V1' that, in the embodiment shown in FIG. 2, is located within the SLIC 1'.

Generally, the voltage source V1' represents any voltage generated either internally on the SLIC or externally to the SLIC, and can be e.g. a voltage regulator, a DC/DC converter, a battery, etc.

Normally, the voltage source V1' is supposed to be ground.

In the embodiment in FIG. 2, the line current supplied by the single current amplifier 3', is controlled by a DC feed unit 4' and an AC transmission unit 5' supplying DC currents IDC' and AC currents IAC', respectively, to the input terminal of the single current amplifier 3'.

As described above in connection with FIG. 1, the DC feed unit 4' supplies the DC currents IDC' in accordance with with a predetermined DC feed characteristic, while the AC transmission unit 5' supplies the AC currents IAC' in response to AC signals, e.g. outgoing speech signals, received from a D/A converter (not shown).

Thus, it should be noted that in the SLIC 1' according to the invention as shown in FIG. 2, both the DC feed unit 4' and the AC transmission unit 5' supply just the input terminal of the single current amplifier 3'. Hereby, the DC feed unit 4' and the AC transmission unit 5' can be made simpler than the corresponding units in FIG. 1 that supply both current amplifiers 2, 3.

In view of the fact that the tip wire A' is connected to a fixed voltage source V1' in the SLIC 1' according to the invention as shown in FIG. 2, no Unit corresponding to the longitudinal suppression unit 6 in FIG. 1 is needed in order to set and control the DC voltage level of the wires A' and B'. Hereby, silicon area is saved and the power consumption of the SLIC will be lower.

The voltage of the wire B' is set by the voltage V1' minus the voltage VL' across the load RL'. When VL'=0, the voltage of the wire B' is equal to V1'. When VL' is at its maximum at IL'=0 as set by the DC feed characteristic, the voltage of the wire B' equals V1' minus VL' maximum. In that VL' is restricted to a maximum value, it is ensured that the current amplifier 3' will not be saturated towards the negative voltage.

Incoming AC signals on the transmission line A', B' in FIG. 2, e.g. incoming speech signals, are detected by a differential amplifier 7' connected with one of its input terminals to the ring wire B', while its other input terminal is connected to the voltage source V1' connected to the tip wire A'.

Due to the fact that an input of the differential amplifier 7' is connected to a fixed voltage, only the other input of the amplifier 7' has to be designed to operate between ground and the negative supply voltage of the current amplifier 3'.

Hereby, the differential amplifier 7' can be made simpler and smaller than the corresponding differential amplifier 7 in FIG. 1.

The embodiment illustrated in FIG. 2 is preferably used in applications with very short transmission lines, where the requirements on so-called longitudinal suppression, i.e. suppression of externally originating longitudinal currents in the transmission line, are not so strict. As indicated above, longitudinal currents are always of the same polarity and the same value in the respective wire. Most often, the externally originating longitudinal currents are AC currents having a frequency of 20–100 Hz. In some cases, they can be DC currents.

To simplify the following description, the longitudinal currents are supposed to be DC currents denoted I1' and I2' in the tip wire A' and the ring wire B', respectively, in FIG. 2. In the embodiments to be described, the longitudinal currents are supposed to be positive DC currents as indicated by arrows. It is however to be understood that the longitudinal currents equally well can be of a negative value.

Suppose that the line current IL' in FIG. 2 is set by the input current to the current amplifier 3' to be e.g. 30 mA.

If there are no longitudinal currents I1' and I2', i.e. I1'=I2'=0, currents IA' and IB' in the tip wire A' and the ring wire B', respectively, will be equal to the line current IL', i.e. IA'=IB'=30 mA.

If longitudinal currents I1' and I2' appear on the wires A' and B', respectively, the line current IL' will, however, not be 30 mA.

Suppose that I1'=I2'=5 mA.

Since IB'=30 mA as set by the current amplifier 3', this causes IL'=IB'–I2' to equal 25 mA and IA'=IL'–I1' to equal 20 mA.

Thus, when longitudinal currents appear, the line current will not remain constant, but will vary. Should the longitudinal currents be AC currents, these AC line current variations would be audible in e.g. a loudspeaker as indicated above.

Figure 3:
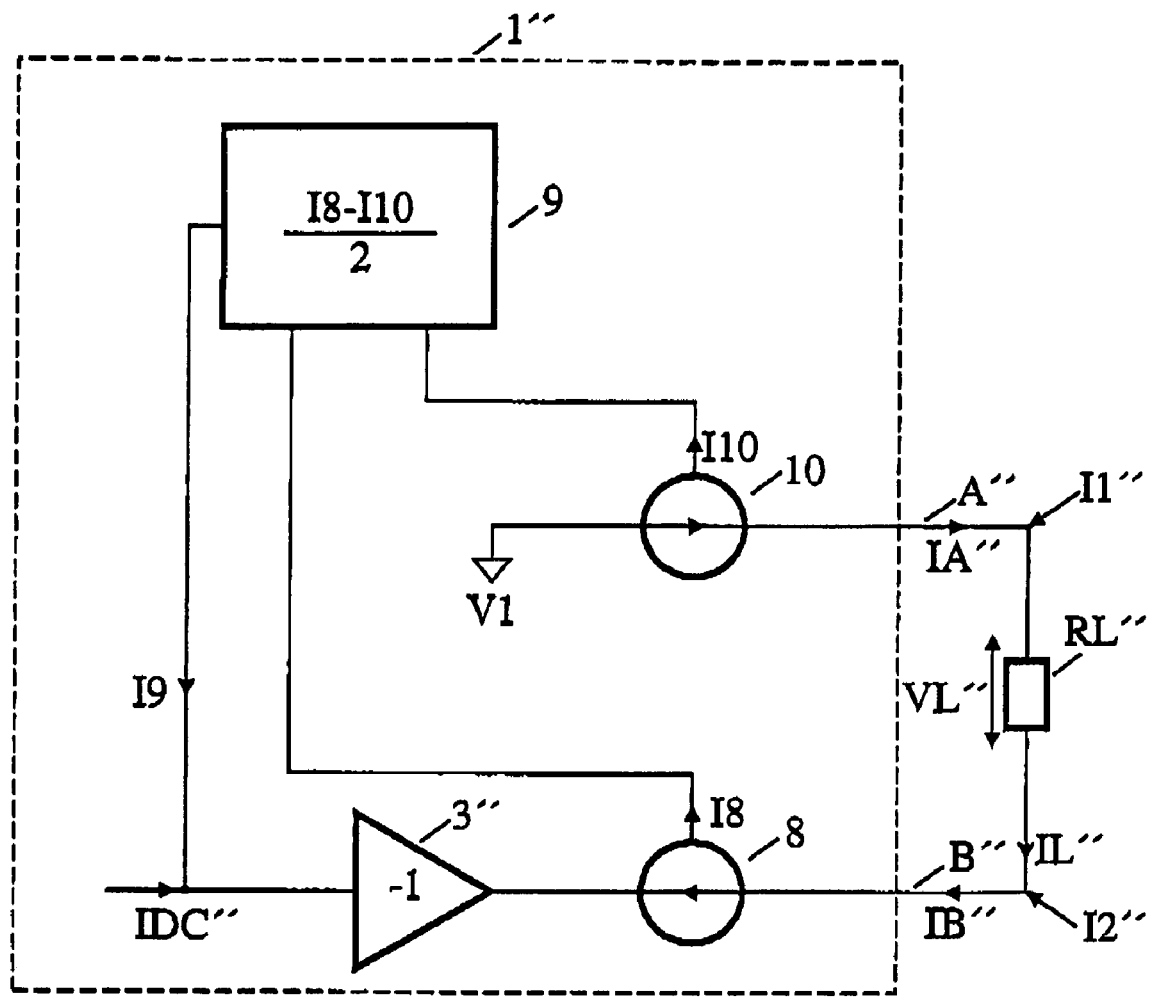

To suppress longitudinal currents, an embodiment of the invention as illustrated in FIG. 3 is to be used.

To simplify the description of FIG. 3, the DC feed unit 4', the AC transmission unit 5', and the differential amplifier 7' in FIG. 2 are not shown in FIG. 3.

As in FIG. 2, a SLIC 1" in FIG. 3 comprises just a single current amplifier 3" connected with its output terminal to a ring wire B" of a two-wire transmission line A", B" connected to a load RL" for supplying line current IL" thereto.

In the embodiment in FIG. 3, the tip wire A" of the transmission line is connected to a voltage source V1" located in the SLIC 1".

Suppose that longitudinal currents I1" and I2" appear in the tip wire A" and the ring wire B", respectively, as shown in the embodiment in FIG. 3.

In accordance with the invention, to suppress these longitudinal currents I1" and I2" appearing on the tip and ring wires, respectively, the output terminal of the current amplifier 3" is connected to the ring wire B" via a current detector 8. The current detector 8 detects the current IB" in the ring wire B" and supplies an output current I8 proportional to the detected current IB", to one input of a current converter 9. In the embodiment in FIG. 3, it is supposed that I8=IB".

Also in accordance with the invention, the voltage source V1" is connected to the tip wire A" of the transmission line via a current detector 10. The current detector 10 detects the current IA" in the tip wire A" and supplies an output current I10 proportional to the detected current IA", to another input terminal of the current converter 9, In the embodiment in FIG, 3, it is supposed that I10=IA".

In the embodiment in FIG. 3, the current converter 9 according to the invention is supposed to generate an output current I9=(I8-I10)/2 and supply it to the input terminal of the single current amplifier 3" to be added to a DC input current IDC" supplied to the input terminal of the current amplifier 3" in the same manner as in FIG. 2.

In this connection, it should be pointed out that (I8-I10)/2 is proportional to the value of the externally originating longitudinal current in the respective wire of the transmission line.

In the embodiment in FIG. 3, (I8-I10)/2 is in fact equal to the value of the externally originating longitudinal current in the respective wire.

As above in connection with FIG. 2, suppose that the desired line current IL" is set by IDC" to be 30 mA and that, for reasons of simplicity, the gain of the current amplifier 3" is −1.

If there are no longitudinal currents, i.e. I1"=I2"=0, IA"=IB"=30 mA. Thus, I9=(30−30)/2=0 mA, i.e. no other DC current but IDC" is fed to the current amplifier 3". Thus, IL" will be equal to 30 mA.

Suppose in FIG. 3 that externally originating longitudinal currents I1"=I2"=5 mA appear. As above in connection with FIG. 2, IB" is set to 30 mA by the current amplifier 3" in that IDC=30 mA. Also as above, IA" will equal 20 mA.

The current converter 9 detects the difference between IB" and IA" and supplies the current I9 (30−20)/2=5 mA to the input terminal of the current amplifier 3".

There, the current I9=5 mA is added to the current IDC"=30 mA. Thus, the input current to the current amplifier 3" will be 5 mA+30 mA=35 mA.

This causes IB"=I8 to equal 35 mA, IL"=IB"-I2" to equal 30 mA, IA"32 IL"-I1"=I10 to equal 25 mA, I9=(35-25)/2 to equal 5 mA, and, consequently, the input DC current to the current amplifier 3", i.e. I9+IDC", to equal 5 mA+30 mA=35 mA.

Thus, the arrangement according to the invention compensates the incoming longitudinal currents by controlling the current amplifier 3" in anti-phase such that the longitudinal currents are suppressed and the current IL" through the load is maintained constant at the desired value, i.e. 30 mA in the above example.

It should be pointed out that the current converter 9 does not necessarily have to supply just the current I9=(I8-I10)/2 to the input terminal of the current amplifier 3". The main thing is that the current I9 should be proportional to any externally originating longitudinal current in the wires A" and B".

Thus, if the gain of the current amplifier 3" does not equal −1 as supposed in FIG. 3, the current I9 would have to be amplified by the current amplifier 3" such that it equals the longitudinal current.

As an alternative (not shown), if properly amplified from the beginning, the current I9 does not have to be supplied to the current amplifier 3" at all, but can instead be supplied directly to the B" wire to suppress longitudinal currents.

The invention claimed is:

1. A subscriber line interface circuit to be connected to a two-wire transmission line, comprising:
    a single current amplifier for supplying line current to the transmission line, the single current amplifier having an output terminal to be connected to one of the wires of the transmission line, the other wire of the transmission line to be connected to a fixed DC voltage source,
    a DC feed unit connected to an input terminal of the single current amplifier, the DC feed unit supplying DC currents in accordance with a predetermined DC feed characteristic to said input of the single current amplifier, and
    an AC transmission unit connected to said input terminal of the single current amplifier, the AC transmission unit supplying AC currents in response to AC signals to said input terminal of the single current amplifier.

2. The subscriber line interface circuit as claimed in claim 1, wherein the output terminal of said single current amplifier is to be connected to the ring wire of the transmission line whose tip wire is to be connected to said voltage source.

3. The subscriber line interface circuit as claimed in claim 1, wherein said voltage source is ground.

4. The subscriber line interface circuit as claimed in claim 1, wherein said voltage source is located within the subscriber line interface circuit.

5. The subscriber line interface circuit as claimed in claim 4, wherein the output terminal of the single current amplifier is to be connected to said one wire via a first current detector adapted to detect current in that wire and supply a first output current proportional to the detected current to a first input terminal of a current converter, the single current amplifier being supplied on its input terminal with an input current to set a desired value of the line current, the voltage source is to be connected to said other wire via a second current detector adapted to detect current in that wire and supply a second output current proportional to the detected current to a second input terminal of the current converter, and the current converter is adapted to supply a current, proportional to any detected, externally originating longitudinal current, to said one wire to suppress any longitudinal current and keep the line current at the set value.

6. The subscriber line interface circuit as claimed in claim 5, characterized in that the current converter is connected with its output terminal to the input terminal of the single current amplifier to supply said current proportional to any detected, externally originating longitudinal current to said one wire via the single current amplifier.

* * * * *

UNITED STATES PATENT AND TRADEMARK OFFICE
CERTIFICATE OF CORRECTION

PATENT NO. : 7,130,416 B2
APPLICATION NO. : 09/736329
DATED : October 31, 2006
INVENTOR(S) : Anders Emericks It is certified that error appears in the above-identified patent and that said Letters Patent is hereby corrected as shown below:

Title Page
Section (73), please change Assignee to "Infineon Technologies AG, Munich (DE)".

Signed and Sealed this

Twenty-fifth Day of November, 2008

JON W. DUDAS
*Director of the United States Patent and Trademark Office*